(12) United States Patent
Molina

(10) Patent No.: US 8,607,500 B1
(45) Date of Patent: Dec. 17, 2013

(54) ROOT ORB SYSTEM AND METHOD

(76) Inventor: Renee Molina, Miami, FL (US)

(*) Notice: Subject to any disclaimer, the term of this patent is extended or adjusted under 35 U.S.C. 154(b) by 91 days.

(21) Appl. No.: 12/910,439

(22) Filed: Oct. 22, 2010

(51) Int. Cl.
*A01G 9/02* (2006.01)
*A01G 31/00* (2006.01)

(52) U.S. Cl.
USPC .............................................. 47/59 S; 47/65.7

(58) Field of Classification Search
USPC .................... 47/32.7, 65.7, 32, 59 S
See application file for complete search history.

(56) References Cited

U.S. PATENT DOCUMENTS

| | | | |
|---|---|---|---|
| 1,994,962 A * | 3/1935 | Rushfeldt | 47/84 |
| 4,109,442 A * | 8/1978 | Maasbach | 53/452 |
| 4,287,840 A * | 9/1981 | Weidner | 111/101 |
| 4,807,393 A * | 2/1989 | Bracken | 47/76 |
| 5,025,590 A * | 6/1991 | Smith | 47/76 |
| 6,105,308 A * | 8/2000 | Ellegaard | 47/58.1 R |
| 7,992,345 B2 * | 8/2011 | Chun | 47/65.7 |
| 2006/0032133 A1 * | 2/2006 | Tuoriniemi et al. | 47/72 |
| 2008/0120907 A1 * | 5/2008 | Nottingham | 47/76 |
| 2008/0216404 A1 * | 9/2008 | Jarvis | 47/59 S |
| 2009/0038219 A1 * | 2/2009 | Bitel | 47/73 |

* cited by examiner

*Primary Examiner* — Monica Williams
(74) *Attorney, Agent, or Firm* — Gold & Rizvi, P.A.; H. John Rizvi

(57) ABSTRACT

The present invention is related to a root orb system and method comprising a mass of organic moss molded onto and weaved around a plant root. It also comprises a method of forming said root orb comprising the steps of: a) placing a mass of dehydrating organic moss on a flat surface; b) rehydrating the moss with water; c) hand-pressing the moss; d) molding the moss onto the plant root; and e) wrapping the molded moss with a string.

7 Claims, 4 Drawing Sheets

ROOT ORB SYSTEM AND METHOD

BACKGROUND OF THE INVENTION

1. Field of the Invention

The present invention relates generally to a root orb made of an organic medium which sustains plant life in a healthy manner and displays any type of plant species in a variety of manners. The invention is, however, more particularly directed to a root orb system which displays and contains a plant or plants in an organic moss.

2. Description of the Prior Art

Mosses are small, soft plants that are typically 0.4-4 inches tall, that commonly grow close together in clumps or mats in damp or shady locations. They do not have flowers or seeds, and their simple leaves cover the thin wiry stems.

There are approximately 12,000 species of moss, and there is a substantial market in mosses gathered from the wild. The uses for intact moss are principally in the florist trade and for home decoration. Decaying moss in the genus *Sphagnum* is also the major component of peat, which is "mined" for use as a fuel, as a horticultural soil additive, among others.

Sphagnum moss, generally the species *cristatum* and *subnitens*, is harvested while still growing and is dried out to be used in nurseries and horticulture as a plant growing medium.

Said Sphagnum moss can be used as a component of peat but in accordance with the inventor's knowledge, there are no applications in which this moss is used as the root container itself.

Even though the known applications of the moss of the prior art address some of the needs of the market, a new root orb using organic moss for containing a plant or plants is still desired.

SUMMARY OF THE INVENTION

This invention is directed to a root orb designed to keep plants healthy and beautiful.

In one general aspect of the present invention, a root orb is made with an organic medium which sustains plant life in a healthy manner and displays any type of plant species in a variety of manners.

Accordingly, it is a primary object of the present invention to provide a root orb using organic moss, specifically a Chilean, Wisconsin sphagnum moss, or other types of organic moss.

Another aspect of the present invention provides a root orb that takes the place of a traditional plant pot by weaving a plant's root ball in organic moss with a fishing string.

Yet another aspect of the purposed invention comprises a root orb that provides a visual cue as well as allows the plant owner to notice when the root orb is dehydrated, suggesting the plant is ready for watering.

Also another aspect of this invention comprises a root orb that allows a unique visual display of any type of plant in many settings such as plates, baskets, driftwood and almost any other household accessory.

Yet another aspect provides a root orb which can also be hung from galvanized bent wire or string.

In summary, the present invention is related to a root orb, comprising a mass of organic moss molded onto and weaved around a plant root.

The invention is also referred to a method for forming a root orb using organic moss, comprising the steps of:
a) dehydrating organic moss;
b) combining the dehydrating moss with water;
c) hand-pressing the moss;
d) molding the moss onto the plant root; and
e) wrapping the molded moss with a string.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

DETAILED DESCRIPTION OF REPRESENTATIVE EMBODIMENTS

Shown throughout the Figures, the invention is directed to a root orb 10 comprising a layer of organic moisturized moss 11 molded over the roots of a plant 12. This root orb 10 is designed to keep plants healthy and beautiful. It is an organic built in pot that is hand woven and takes the place of a traditional plant pot by wrapping (weaving) a plant's root ball in organic moss (Chilean, sphagnum or any type of organic moss) using any type of string 13.

This allows a unique visual display of any type of plant in many settings such as plates, baskets, driftwood and almost any other household accessory. Some of the plants assembled with root orb can also hang from galvanized bent Wire or string.

The root orb 10 serves the same function as a conventional plant pot. It also provides a proper plant hydration sign by providing a visual cue as well as allowing the plant owner to notice when the root orb 10 is dehydrated, suggesting the plant is ready for watering.

Watering of the root orb 10 can be done outside or in a sink. The watering is a simple process: immerse it in a container of water and then allow excess water to drain, and then return the plant to its desired location. The root orb also helps avoid typical plant problems such as stagnant indoor water, overhydration or underhydration. The root orb 10 of the present invention can be applied to a variety of plants.

Figure 1:
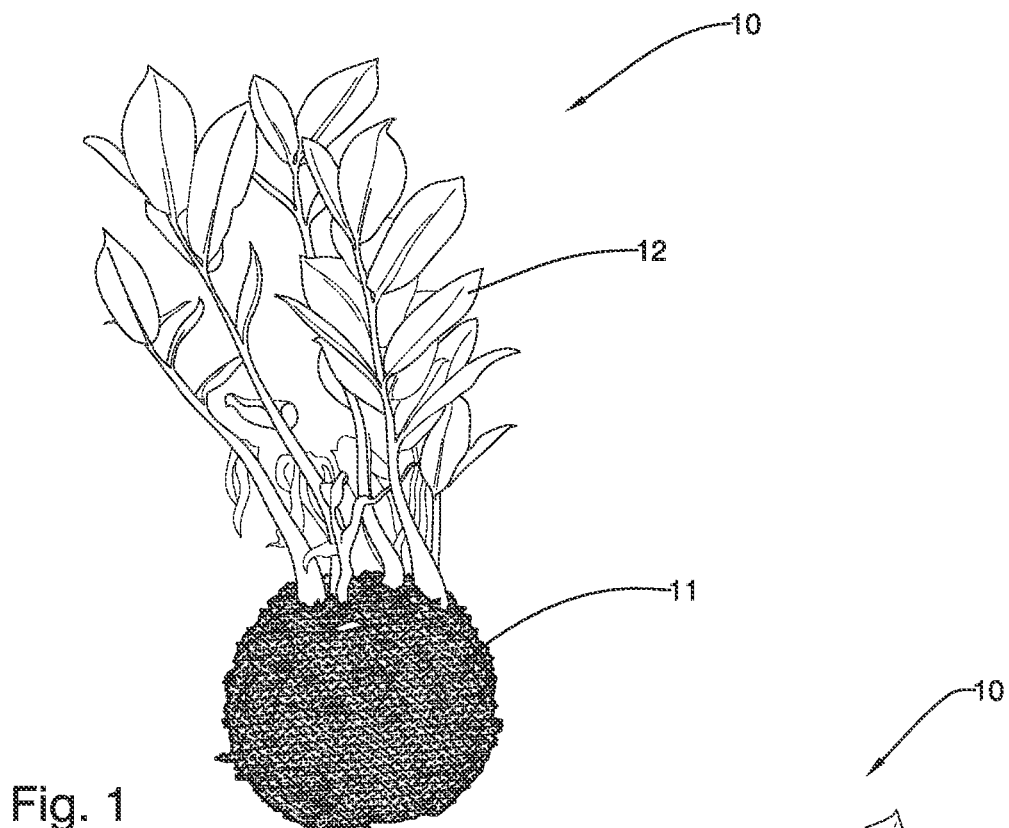
FIG. 1 is a general perspective view of the root orb in accordance with the present invention.
Figure 2:
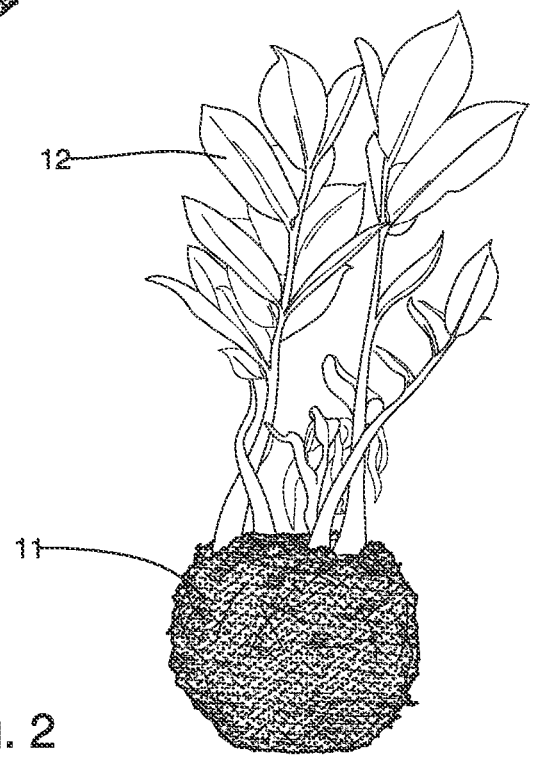
FIG. 2 is a front elevational view of the present root orb.
Figure 3:
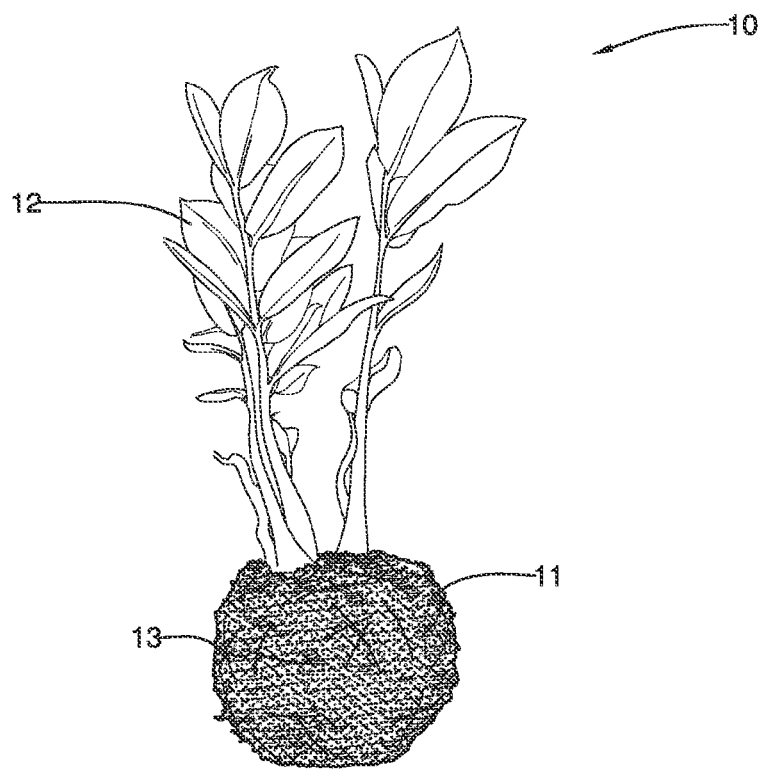
FIG. 3 is a side elevational view of the root orb.
Figure 4:
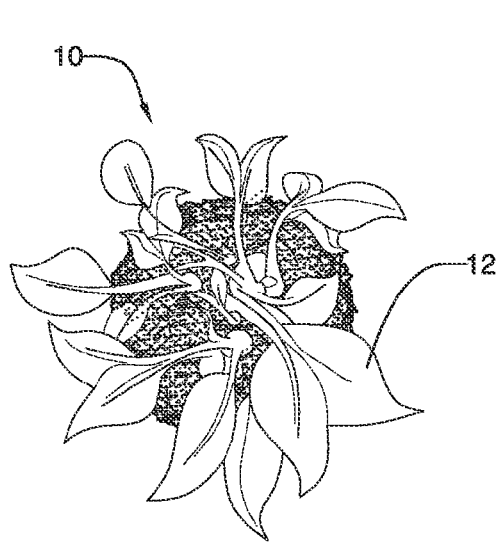
FIG. 4 is a top plan view.
Figure 5:
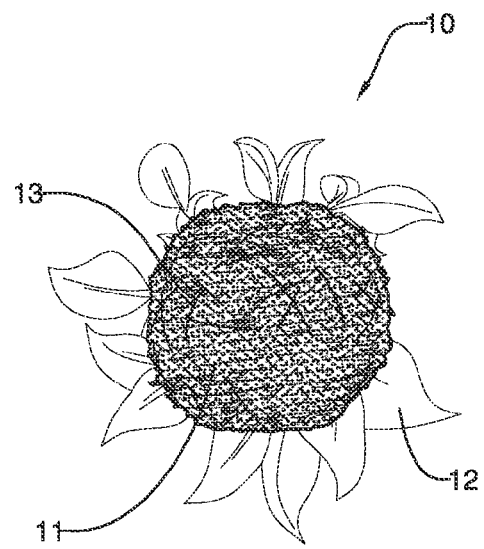
FIG. 5 is a bottom plan view.
Figure 6:
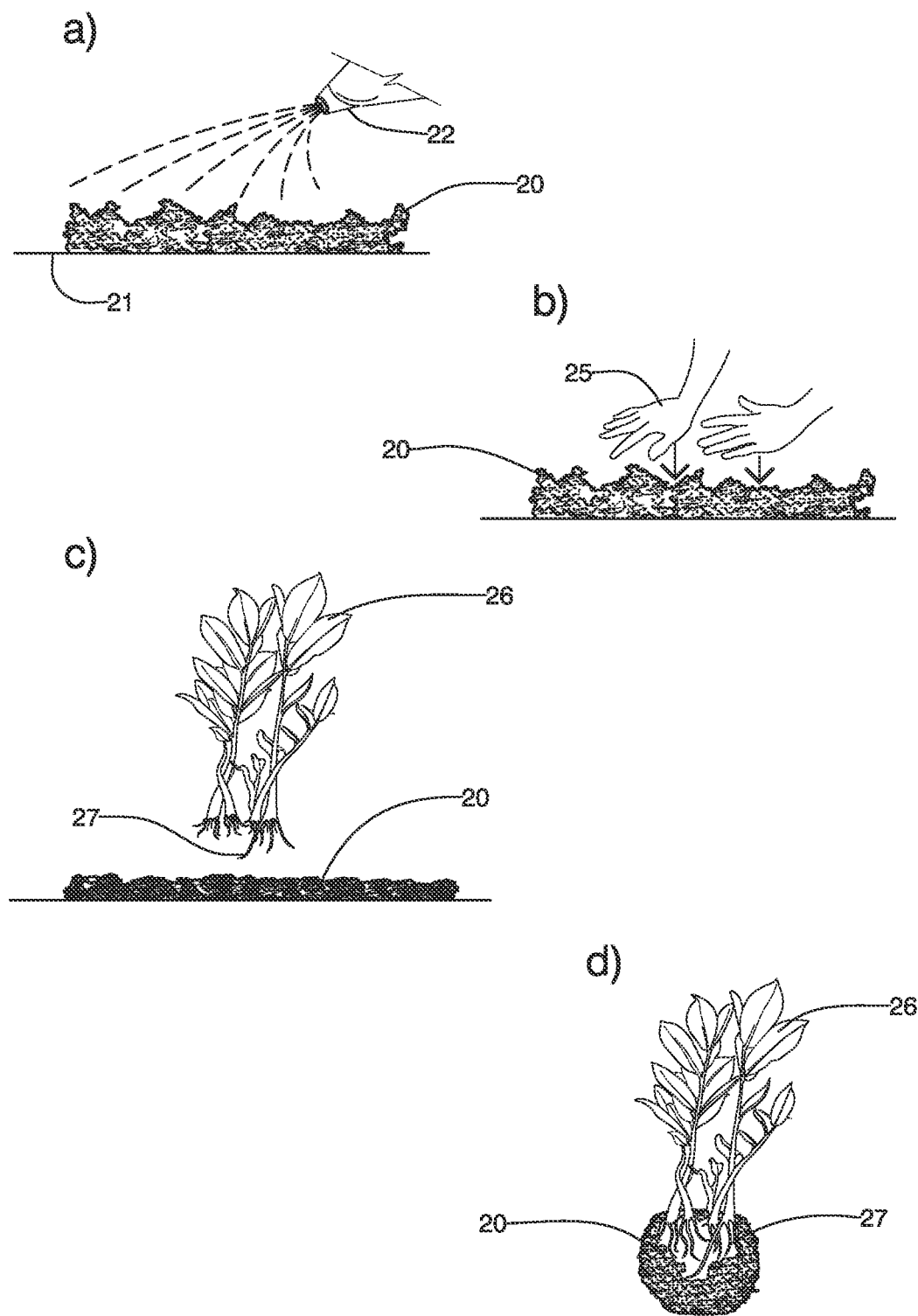
FIGS. 6A-H illustrate the different steps of the method of the present invention.
Figure 6:
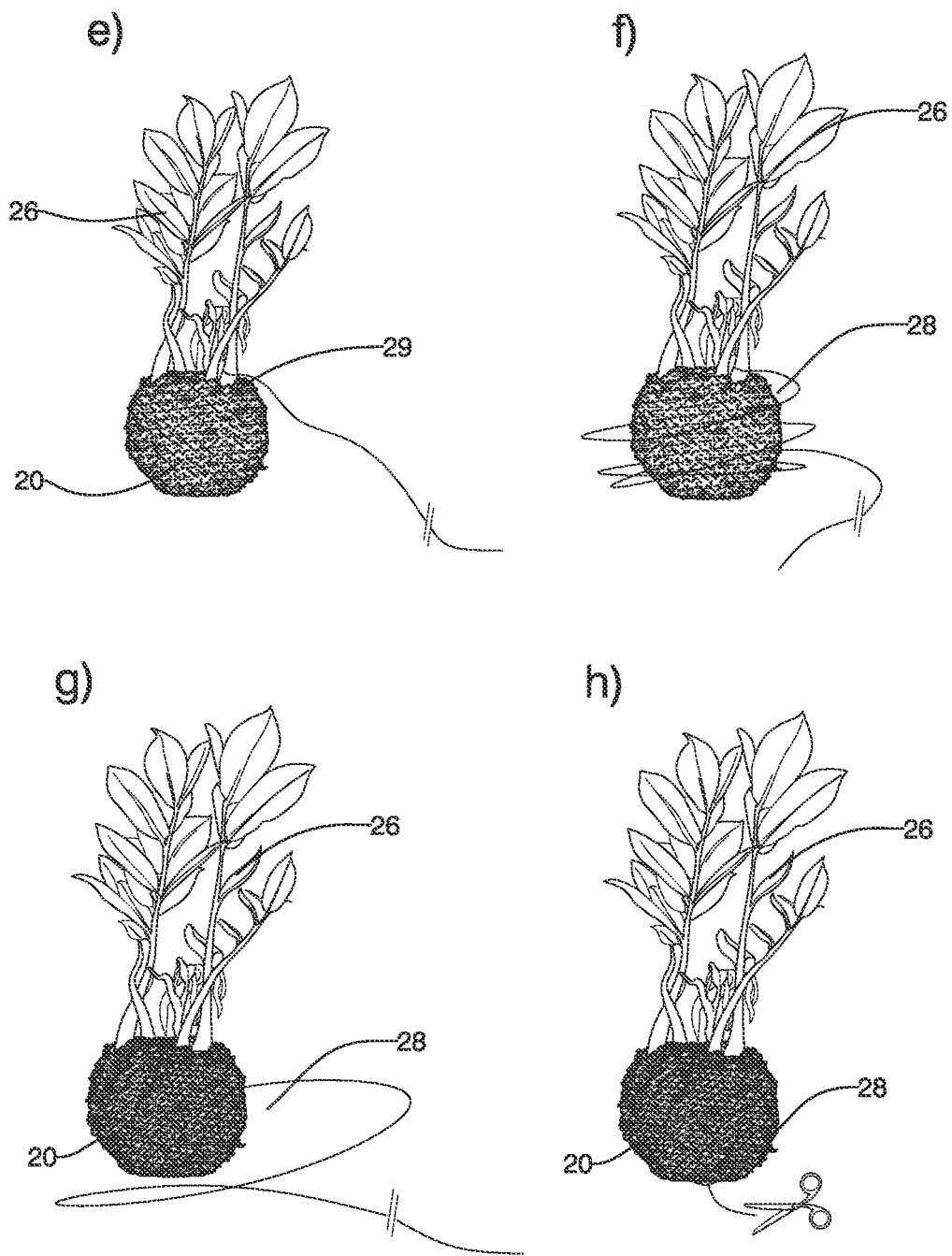

In order to explain in detail the present invention, a method of manufacturing or forming of said root orb 10 is also explained. FIG. 6 illustrates the steps needed to form the orb, as follows:

a) the organic dehydrated moss 20 is placed on a flat surface 21, and it is rehydrated with water (FIG. 6A);

b) once the moss is rehydrated, the user compacts it by pressing the mass of the moss with his/her hands 25. With this action, the moss is more compacted (FIG. 6B);

c) a plant 26 is placed right over the moss 20 with the roots 27 in contact with the upper surface of the moss 20 (FIG. 6C);

d) the moss 20 is molded onto the plant root 27 (FIG. 6D);

e) the end 29 of a string 28 is tied to the plant (FIG. 6E);

f) the string 28 is weaved around the molded moss (FIG. 6F);

g) the string 28 is weaved as many times as necessary to create a compact layer of moss around the plant's roots (FIG. 6G); and finally h) the end of the string is cut and tied to the bottom of the root orb 20. All the fibers of the moss are held together with the string 28.

The average life span of the present root orb is 0.5-1 year and annually or biannually the user may place a new additional layer of moss around the original one.

Once placed over the plant's roots, the orb has the tendency to stay in better shape if it is watered by dipping instead of spraying.

While the preferred embodiments of the invention have been described above, it will be recognized and understood that various modifications can be made in the invention and the appended claims are intended to cover all such modifications which may fall within the spirit and scope of the invention.

I claim:

1. A root orb, comprising a mass of organic moss molded onto a plant root of a plant such that the moss substantially engulfs the plant root and a fishing string woven around the moss, wherein the root orb provides a visual indication of dehydration and hydration of the plant root and wherein an end of the string is tied to the plant root.

2. The root orb of claim 1, wherein the moss is sphagnum moss.

3. The root orb of claim 2, wherein the moss is selected from Chilean sphagnum moss and Wisconsin sphagnum moss.

4. The root orb of claim 1, wherein the moss is dehydrated moss.

5. The root orb of claim 1, wherein one end of the woven string is tied to the plant.

6. The root orb of claim 1, wherein an end of the woven string is tied to a bottom of the root orb.

7. The root orb of claim 1, wherein the root orb forms a rounded built-in pot around the plant roots.

\* \* \* \* \*